United States Patent
Park

(10) Patent No.: US 8,555,620 B2
(45) Date of Patent: Oct. 15, 2013

(54) EXHAUST GAS AFTERTREATMENT METHOD

(75) Inventor: Jun Sung Park, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 187 days.

(21) Appl. No.: 13/174,291

(22) Filed: Jun. 30, 2011

(65) Prior Publication Data

US 2012/0131906 A1    May 31, 2012

(30) Foreign Application Priority Data

Nov. 30, 2010   (KR) .................. 10-2010-0120935

(51) Int. Cl.
*F01N 3/00*    (2006.01)

(52) U.S. Cl.
USPC .................. 60/295; 60/297; 60/311

(58) Field of Classification Search
USPC .......................... 60/277, 295, 297
See application file for complete search history.

(56) References Cited

U.S. PATENT DOCUMENTS

| 7,159,391 B2 * | 1/2007 | Kogo et al. ............. 60/297 |
| 2004/0000139 A1 * | 1/2004 | Kawashima et al. ........ 60/295 |

FOREIGN PATENT DOCUMENTS

| JP | 2005-519212 A | 6/2005 |
| JP | 2006-274982 A | 10/2006 |
| JP | 2007-538192 A | 12/2007 |
| JP | 2009-197763 A | 9/2009 |
| KR | 100802722 B1 | 2/2008 |
| KR | 1020080055044 | 6/2008 |

* cited by examiner

*Primary Examiner* — Thomas Denion
*Assistant Examiner* — Philip Eklem
(74) *Attorney, Agent, or Firm* — Morgan, Lewis & Bockius LLP

(57) ABSTRACT

An exhaust gas aftertreatment method may include a regenerating a diesel particulate filter normally, accumulating a time from a point that the diesel particulate filter starts to be regenerated, determining whether the diesel particulate filter enters into an abnormal regeneration condition or not according to a predetermined condition of an engine, and regenerating the diesel particulate filter according to the abnormal regeneration logic, if the accumulated time is within a predetermined time in a condition that the abnormal regeneration condition is satisfied and regenerating the diesel particulate filter according to the normal regeneration logic, if the accumulated time is out of the predetermined time. Accordingly, if the time elapses a predetermined time from a point that that the diesel particulate filter starts to be regenerated, although the vehicle enters into the idle condition or the over-run condition, the abnormal regeneration logic is not performed such that the fuel consumption is saved and the diesel particulate filter is safely regenerated.

5 Claims, 2 Drawing Sheets

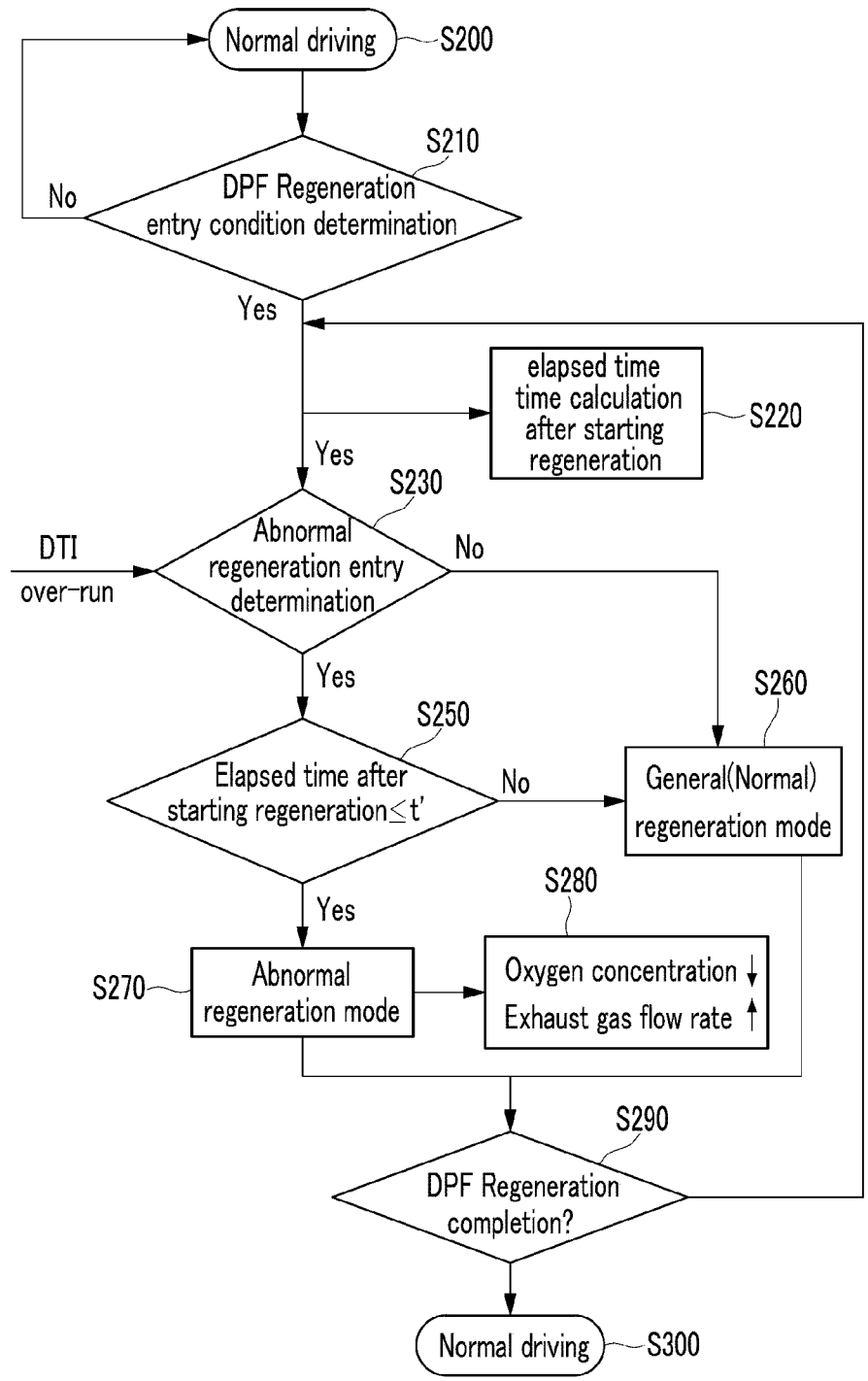

EXHAUST GAS AFTERTREATMENT METHOD

CROSS-REFERENCE TO RELATED APPLICATION

This application claims priority to and the benefit of Korean Patent Application No. 10-2010-0120935 filed Nov. 30, 2010, the entire contents of which application is incorporated herein for all purposes by this reference.

BACKGROUND OF INVENTION

1. Field of Invention

The present invention relates to an exhaust gas aftertreatment method that regenerates a diesel particulate filter that traps particulate matters included in the exhaust gas and burns them out.

2. Description of Related Art

Reducing harmful matters is an important problem in a diesel automobile that generates a large amount of noxious exhaust gas. Particularly, it is necessary to reduce PM (particulate matters) caused by incomplete combustion of fuel.

A variety of techniques have been introduced to reduce the PM, and among them there is a DPF (diesel particulate filter) for trapping the PM in the exhaust gas and the temperature of DPF is raised up to a temperature higher than the ignition point thereof so that the PM will be eliminated.

The diesel particulate filter is smoothly regenerated in a condition that the exhaust gas temperature is high, like under high speed or high load, but the exhaust gas temperature must be forcibly raised to regenerate the DPF in a low load driving condition.

Meanwhile, a temperature of the DPF is raised during regeneration of the diesel particulate filter, if the engine enters into an idle condition in the mean time, a large amount of $O_2$ suddenly flows into the diesel particulate filter to raise the inner temperature thereof, consequently there is a problem that the durability of the diesel particulate filter is worsen such that the DPF finally can be damaged.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an exhaust gas aftertreatment method having advantages of preventing the temperature of the DPF from being excessively raised during the regeneration thereof.

An exhaust gas aftertreatment method according to various embodiments of the present invention may include regenerating a diesel particulate filter normally, accumulating a time from a point that the diesel particulate filter starts to be regenerated, determining whether the diesel particulate filter enters into an abnormal regeneration condition or not according to a predetermined condition of an engine, and regenerating the diesel particulate filter according to the abnormal regeneration logic, if the accumulated time is within a predetermined time in a condition that the abnormal regeneration condition is satisfied and regenerating the diesel particulate filter according to the normal regeneration logic, If the accumulated time is out of the predetermined time.

The abnormal regeneration condition of the diesel particulate filter may include a DTI (drop to idle), which means that the engine is abruptly entering into an idle condition, or an over-run condition of the engine.

The predetermined time that is accumulated from a point that the diesel particulate filter starts to be regenerated may range from 50 to 150 seconds.

The abnormal regeneration logic may include decreasing a concentration of oxygen included in the exhaust gas or increasing a flow rate of the exhaust gas.

The abnormal regeneration logic may include increasing injection amount of fuel in an idle condition or increasing a recirculation amount of the exhaust gas.

As described above, if the time elapses a predetermined time from a point that that the diesel particulate filter starts to be regenerated, although the vehicle enters into the idle condition or the over-run condition, the abnormal regeneration logic is not performed such that the fuel consumption is saved and the diesel particulate filter is safely regenerated in accordance with the exhaust gas aftertreatment method according to the present invention.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a flowchart showing an exemplary exhaust gas aftertreatment method according to the present invention.

DETAILED DESCRIPTION

Figure 1:
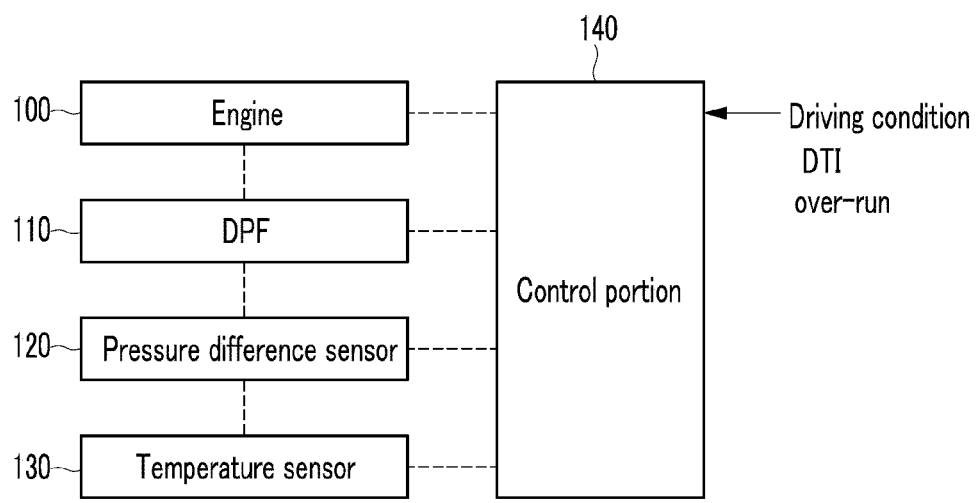
FIG. 1 is a schematic diagram of an exemplary exhaust gas aftertreatment system according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, an exhaust gas aftertreatment system includes an engine 100, a diesel particulate filter (110, DPF), a differential pressure sensor 120, a temperature sensor 130, and a control portion 140.

The exhaust gas is exhausted from the engine 100, and the diesel particulate filter 110 traps particulate matters included in the exhaust gas.

The differential pressure sensor 120 detects a pressure difference between a downstream side and an upstream side of the diesel particulate filter 110 and transmits the detected signal to the control portion 140, and the control portion 140 analyzes the signal for the pressure difference and calculates the trapped amount of the particulate matters.

The temperature sensor 130 detects a temperature of the exhaust gas flowing into the diesel particulate filter 110 and transmits the detected signal to the control portion 140.

If the diesel particulate filter 110 starts to be regenerated based on the differential pressure signal, the temperature of the exhaust gas flowing into the diesel particulate filter 110 is raised by a post injection of fuel and then the trapped particulate matters in the diesel particulate filter 110 is burned to be eliminated.

The control portion 140 detects a driving condition of a vehicle, and particularly detects whether the vehicle enters into an idle condition or an over-run condition or not.

While the diesel particulate filter 110 is normally regenerated, if the vehicle enters into an idle condition or an over-run condition, the diesel particulate filter 110 is regenerated in accordance with the abnormal regeneration logic to prevent the temperature thereof from being excessively raised.

The abnormal regeneration logic includes decreasing a concentration of oxygen included in the exhaust gas or increasing a flow rate of the exhaust gas so as to drop an exhaust gas temperature such that an inner temperature of the diesel particulate filter 110 is decreased.

That is, in order to decrease an inner temperature of the diesel particulate filter 110 by reducing a concentration of the oxygen or increasing the flow rate of the exhaust gas, the amount of the fuel injection can be increased or the amount of the exhaust gas recirculation that is recirculated from the exhaust line to the intake line can be increased.

Meanwhile, as the time that the diesel particulate filter 110 is regenerated passes longer than a predetermined time, the maximum inner temperature of the diesel particulate filter 110 that might be measured during abnormal regeneration descends.

Accordingly, when the regeneration time exceeds a predetermined time in various embodiments of the present invention, although the vehicle enters into an idle condition or an over-run condition, the diesel particulate filter 110 is normally regenerated according to a normal logic.

Merely, in a case that the regeneration time of the diesel particulate filter 110 is within a predetermined time, if the vehicle enters into an idle condition or an over-run condition, the diesel particulate filter 110 is regenerated in accordance with the abnormal regeneration logic. That is, the concentration of oxygen included in the exhaust gas is decreased or the flow rate of the exhaust gas is increased in the normal regeneration mode.

Referring to FIG. 2, an engine is normally operated in a S200. It is determined whether a regeneration condition of the diesel particulate filter 110 is satisfied or not in a S210.

If the regeneration condition of the diesel particulate filter 110 is satisfied, the diesel particulate filter 110 is substantially regenerated by the control portion 140, and a time is accumulated from a point that the DPF 110 starts to be regenerated in a S220. That is, the time is accumulated from the regeneration start point.

It is determined whether an abnormal regeneration condition is satisfied or not in a S230, wherein the abnormal regeneration condition includes entering into an idle condition or entering into an over-run condition.

If it is determined that the abnormal regeneration entering condition is not satisfied in the S230, a S260 is performed to normally regenerate the diesel particulate filter 110 according to the normal regeneration logic.

If it is determined that the abnormal regeneration entering condition is satisfied in the S230, it is determined whether a time that is accumulated from a point that the diesel particulate filter 110 starts to be regenerated is shorter than a predetermined time (t').

If the time that is accumulated from a point that the regeneration starts to be performed is shorter than a predetermined time (t') in a S250, the regeneration is performed according to the abnormal regeneration logic in a S270 and the oxygen concentration is reduced or the exhaust gas flow rate is increased in a S280 so as to substantially perform the abnormal regeneration logic.

If the time that is accumulated from a point that the regeneration starts to be performed is longer than a predetermined time (t') in a S250, the diesel particulate filter 110 is regenerated according to the normal logic regardless of entering into the idle condition or entering into the over-run condition.

After the S270 or the S260 is performed, it is determined whether the diesel particulate filter 110 is completely regenerated or not, if the regeneration is completed, it is returned to a normal operation in a S300.

As described above, while the diesel particulate filter 110 is normally regenerated, if the vehicle enters into an idle condition or an over-run condition and the elapsed time that is accumulated from a regeneration starting point is shorter than a predetermined time, the abnormal regeneration logic is performed so as to prevent the diesel particulate filter 110 from being over-heated.

Meanwhile, if the elapsed time from the regeneration starting point is longer than the predetermined time, the diesel particulate filter 110 is regenerated according to a normal logic regardless of the idle condition or the over-run condition of the vehicle such that the fuel consumption is saved and the diesel particulate filter 110 is safely regenerated.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust gas aftertreatment method, comprising:
   regenerating a diesel particulate filter normally;
   accumulating time from a point that the diesel particulate filter starts to be regenerated;
   determining whether or not the diesel particulate filter enters into an abnormal regeneration condition according to a predetermined condition of an engine; and
   regenerating the diesel particulate filter according to the abnormal regeneration logic if the accumulated time is within a predetermined time in a condition that the abnormal regeneration condition is satisfied, and regenerating the diesel particulate filter according to the normal regeneration logic if the accumulated time is out of the predetermined time.

2. The exhaust gas aftertreatment method of claim 1, wherein the abnormal regeneration condition of the diesel particulate filter includes a drop to idle (DTI) mode in which means the engine abruptly enters into an idle condition or an over-run condition of the engine.

3. The exhaust gas aftertreatment method of claim 1, wherein the predetermined time that is accumulated from a point that the diesel particulate filter starts to be regenerated ranges from 50 to 150 seconds.

4. The exhaust gas aftertreatment method of claim 1, wherein the abnormal regeneration includes at least one of decreasing a concentration of oxygen included in the exhaust gas or increasing a flow rate of the exhaust gas.

5. The exhaust gas aftertreatment method of claim 4, wherein the abnormal regeneration includes at least one of increasing the amount of fuel injection in an idle condition or increasing the amount of the exhaust gas recirculation.

* * * * *